(12) United States Patent
Chang

(10) Patent No.: US 6,808,065 B2
(45) Date of Patent: Oct. 26, 2004

(54) DISC STORAGE BOX HAVING A DISC POSITIONING DEVICE

(76) Inventor: Kun-Fa Chang, No. 98, Yung He Rd., Da Ya Hsiang, Taichung Hsien (TW)

( * ) Notice: Subject to any disclaimer, the term of this patent is extended or adjusted under 35 U.S.C. 154(b) by 118 days.

(21) Appl. No.: 10/352,645

(22) Filed: Jan. 27, 2003

(65) Prior Publication Data

US 2004/0144663 A1 Jul. 29, 2004

(51) Int. Cl.[7] .............................................. B65D 85/57
(52) U.S. Cl. .................................... 206/308.1; 206/310
(58) Field of Search ............................. 206/307, 308.1, 206/310, 311, 312, 493, 313

(56) References Cited

U.S. PATENT DOCUMENTS 6,237,763 B1 * 5/2001 Lau ......................... 206/308.1
6,398,022 B1 * 6/2002 Mou et al. ................ 206/308.1
6,609,614 B1 * 8/2003 Huang ..................... 206/308.1

* cited by examiner

Primary Examiner—Jacob K. Ackun, Jr.
(74) Attorney, Agent, or Firm—Charles E. Baxley

(57) ABSTRACT

A disc storage box includes a main body, and a disc positioning device integrally formed on the main body. The disc positioning device includes a locking portion having a protruding locking knob which formed with a press face, a plurality of insertion blocks and locking arms arranged in a staggered manner, and a plurality of gaps each located between each of the insertion blocks and each of the locking arms. Each of the locking arms is formed with a protruding boss. Thus, the disc is exactly locked on the disc positioning device stably and rigidly, thereby preventing from detachment of the disc due to a violent vibration or shock.

7 Claims, 9 Drawing Sheets

DISC STORAGE BOX HAVING A DISC POSITIONING DEVICE

BACKGROUND OF THE INVENTION

1. Field of the Invention

The present invention relates to a disc storage box having a disc positioning device, and more particularly to a disc storage box having a disc positioning device, wherein the disc is exactly locked on the disc positioning device stably and rigidly, thereby preventing from detachment of the disc due to a violent vibration or shock.

2. Description of the Related Art

A first conventional disc storage box in accordance with the prior art shown in FIG. 1 comprises a main body 10, and a circular fixing seat 11 mounted on the main body 10. The circular fixing seat 11 includes a plurality of helical shaped guide plates 12 for mounting a disc (not shown), a plurality of support arms 13 formed on the periphery of each of the guide plates 12, and a plurality of locking slots 14 each located between any two adjacent support arms 13. However, the disc is easily detached from the guide plates 12 due to a larger vibration or shock.

A second conventional disc storage box in accordance with the prior art shown in FIG. 2 comprises a main body 20, and a support seat 21 mounted on the main body 20. The support seat 21 is formed with a plurality of partitions 22 and a plurality of locking arms 23 arranged in a staggered manner. The support seat 21 is formed with a press face 24 integrally formed with the plurality of partitions 22. Each of the plurality of partitions 22 is formed with an oblique guide face 25. Each of the plurality of partitions 22 is formed with a positioning face 27 connected to the support seat 21. Each of the plurality of locking arms 23 is formed with an oblique guide face 28. Each of the plurality of locking arms 23 is formed with a positioning face 28 connected to the support seat 21. The positioning face 28 of each of the plurality of locking arms 23 is formed with a locking hook 29. However, the user needs to apply a larger force on the press face 24 of the support seat 21 so as to detach the disc (not shown) from the locking hook 29 of the positioning face 28 of each of the plurality of locking arms 23.

A third conventional disc storage box in accordance with the prior art shown in FIG. 3 comprises a main body 30, and a support seat 31 mounted on the main body 30. The support seat 31 is formed with a locking lug 32 having a top formed with a press face 33. The locking lug 32 of the support seat 31 is formed with three slits 34, thereby forming three locking arms 35. The support seat 31 is formed with a plurality of elastic slits 36 connected to the locking lug 32. However, the locking arms 35 are easily broken during a long-term utilization or broken due to an excessive pressing force, thereby decreasing the lifetime of the disc storage box.

SUMMARY OF THE INVENTION

The present invention has arisen to mitigate and/or obviate the disadvantage of the conventional disc storage boxes.

The primary objective of the present invention is to provide a disc storage box having a disc positioning device, wherein the disc is actually mounted on the disc positioning device easily and conveniently.

Another objective of the present invention is to provide a disc storage box having a disc positioning device, wherein the disc is exactly locked on the disc positioning device stably and rigidly, thereby preventing from detachment of the disc due to a violent vibration or shock.

A further objective of the present invention is to provide a disc storage box having a disc positioning device, wherein the disc is detached from the disc positioning device rapidly, easily and conveniently.

In accordance with the present invention, there is provided a disc storage box having a disc positioning device, comprising a main body, and a disc positioning device integrally formed on the main body, wherein:

the disc positioning device includes a locking portion;

the locking portion of the disc positioning device is formed on the center of the main body and has an inner periphery formed with a plurality of hook slots, the locking portion of the disc positioning device has a central portion formed with a protruding locking knob which has a top formed with a press face;

the locking knob of the locking portion of the disc positioning device has a periphery formed with a plurality of insertion blocks and a plurality of locking arms arranged in a staggered manner, the periphery of the locking knob of the locking portion of the disc positioning device is formed with a plurality of gaps each located between each of the insertion blocks and each of the locking arms;

each of the insertion blocks of the locking knob of the locking portion of the disc positioning device is formed with a slit which is extended outward and connected to one of the hook slots of the locking portion; and each of the locking arms of the locking knob of the locking portion of the disc positioning device is formed with a protruding boss.

Further benefits and advantages of the present invention will become apparent after a careful reading of the detailed description with appropriate reference to the accompanying drawings.

DETAILED DESCRIPTION OF THE INVENTION

Figure 1:
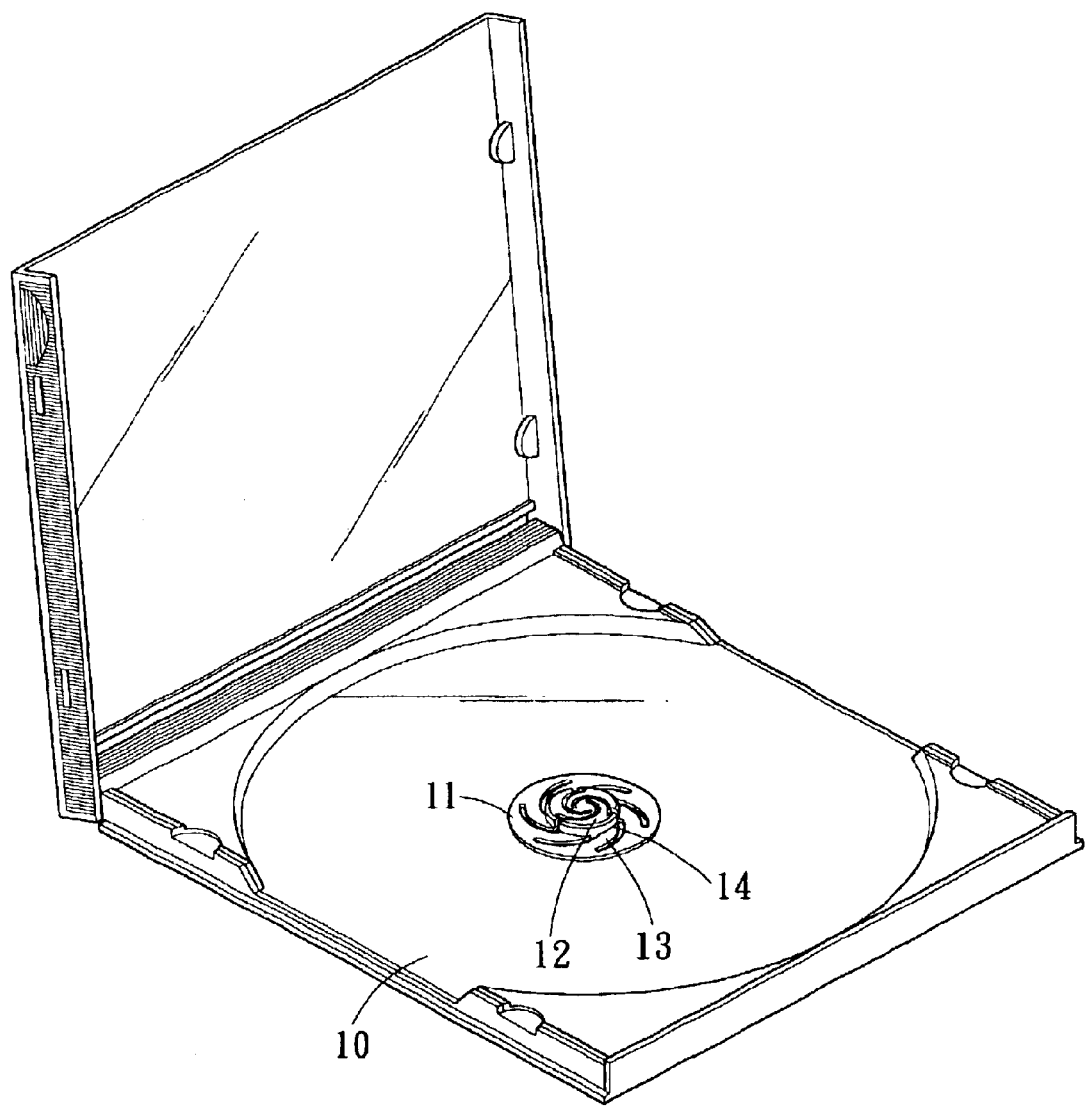
FIG. 1 is a perspective view of a first conventional disc storage box in accordance with the prior art.
Figure 2:
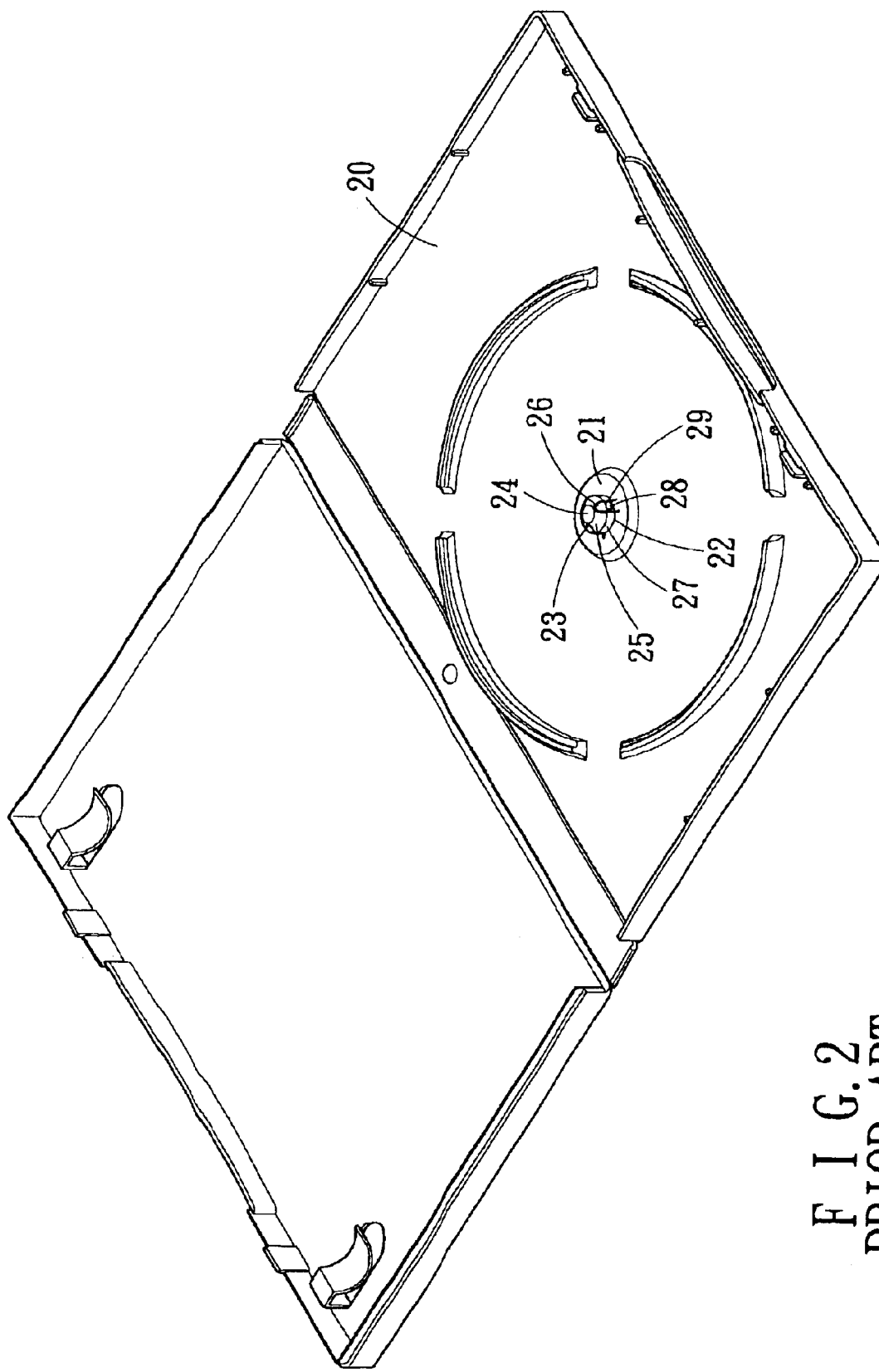
FIG. 2 is a perspective view of a second conventional disc storage box in accordance with the prior art.
Figure 3:
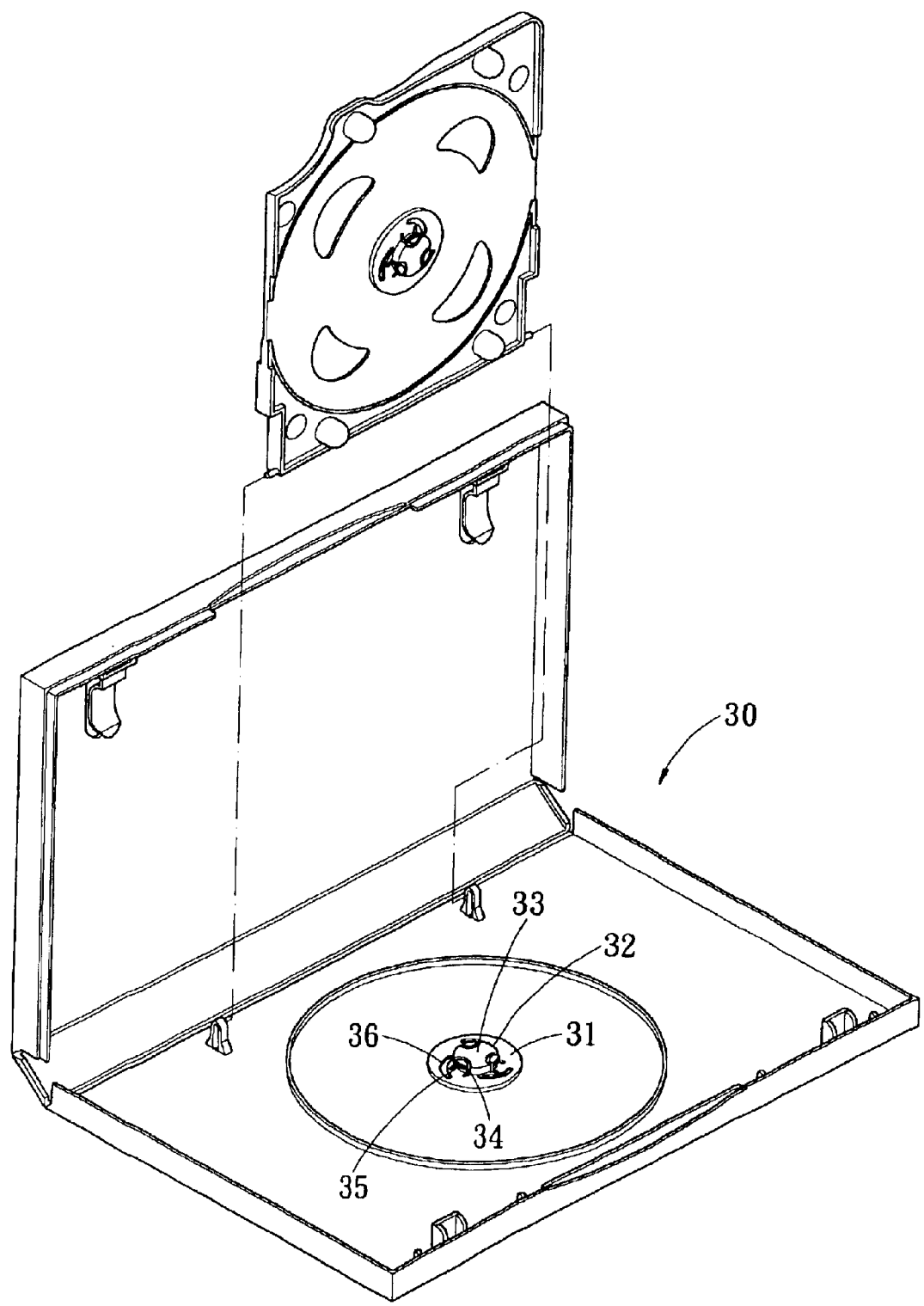
FIG. 3 is a perspective view of a third conventional disc storage box in accordance with the prior art.

Referring to the drawings and initially to FIGS. 4–7, a disc storage box having a disc positioning device in accordance with a preferred embodiment of the present invention comprises a main body 51, and a disc positioning device 50 integrally formed on the main body 51.

The disc positioning device 50 includes a placing portion 60, a plurality of insertion portions 70, and a locking portion 80.

The placing portion 60 of the disc positioning device 50 has a circular shape, and is formed on and protruded from the main body 51. The placing portion 60 of the disc positioning device 50 has an inner periphery formed with a support flange 61.

Each of the plurality of insertion portions 70 of the disc positioning device 50 has a concave shape, and is formed on the placing portion 60. Each of the plurality of insertion portions 70 of the disc positioning device 50 is formed with an arcuate support plte 71.

The locking portion 80 of the disc positioning device 50 is formed on the center of the placing portion 60. The locking portion 80 of the disc positioning device 50 has an outer periphery formed with an annular lug 81 and an inner periphery formed with a plurality of arcuate hook slots 82. The locking portion 80 of the disc positioning device 50 has a central portion formed with a protruding locking knob 83 which has a top formed with a press face 84. The locking knob 83 of the locking portion 80 of the disc positioning device 50 has a periphery formed with a plurality of insertion blocks 85 and a plurality of locking arms 86 arranged in a staggered manner.

The periphery of the locking knob 83 of the locking portion 80 of the disc positioning device 50 is formed with a plurality of gaps 87 each located between each of the insertion blocks 85 and each of the locking arms 86. Each of the insertion blocks 85 of the locking knob 83 of the locking portion 80 of the disc positioning device 50 is formed with a slit 851 which is extended outward and connected to one of the hook slots 82 of the locking portion 80. Each of the locking arms 86 of the locking knob 83 of the locking portion 80 of the disc positioning device 50 is formed with a protruding boss 88. Each of the locking arms 86 of the locking knob 83 of the locking portion 80 of the disc positioning device 50 has a top formed with an oblique arcuate guide face 861 located adjacent to the press face 84.

Figure 4:
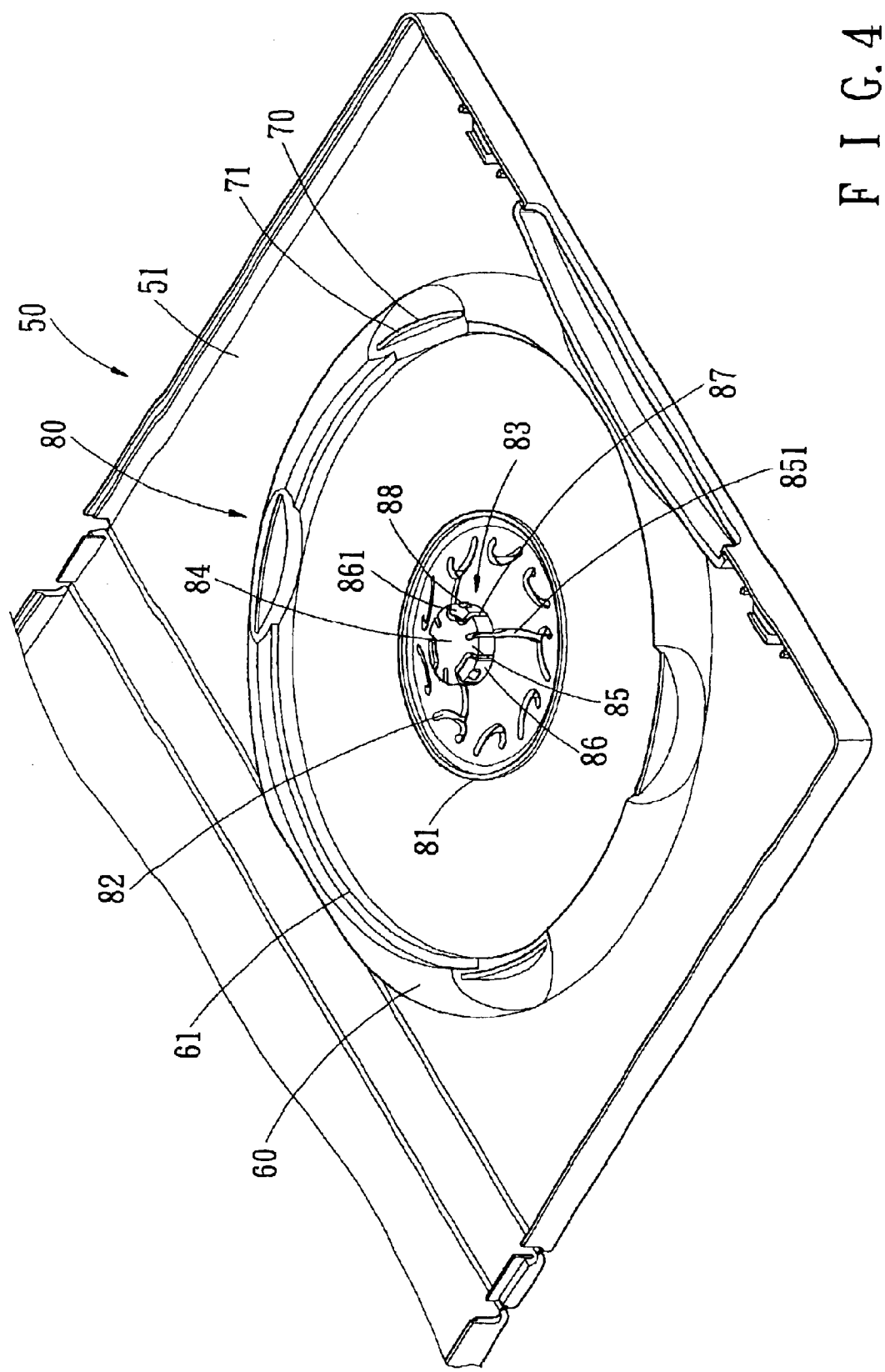
FIG. 4 is a partially cut-away perspective view of a disc storage box having a disc positioning device in accordance with a preferred embodiment of the present invention.
Figure 5:
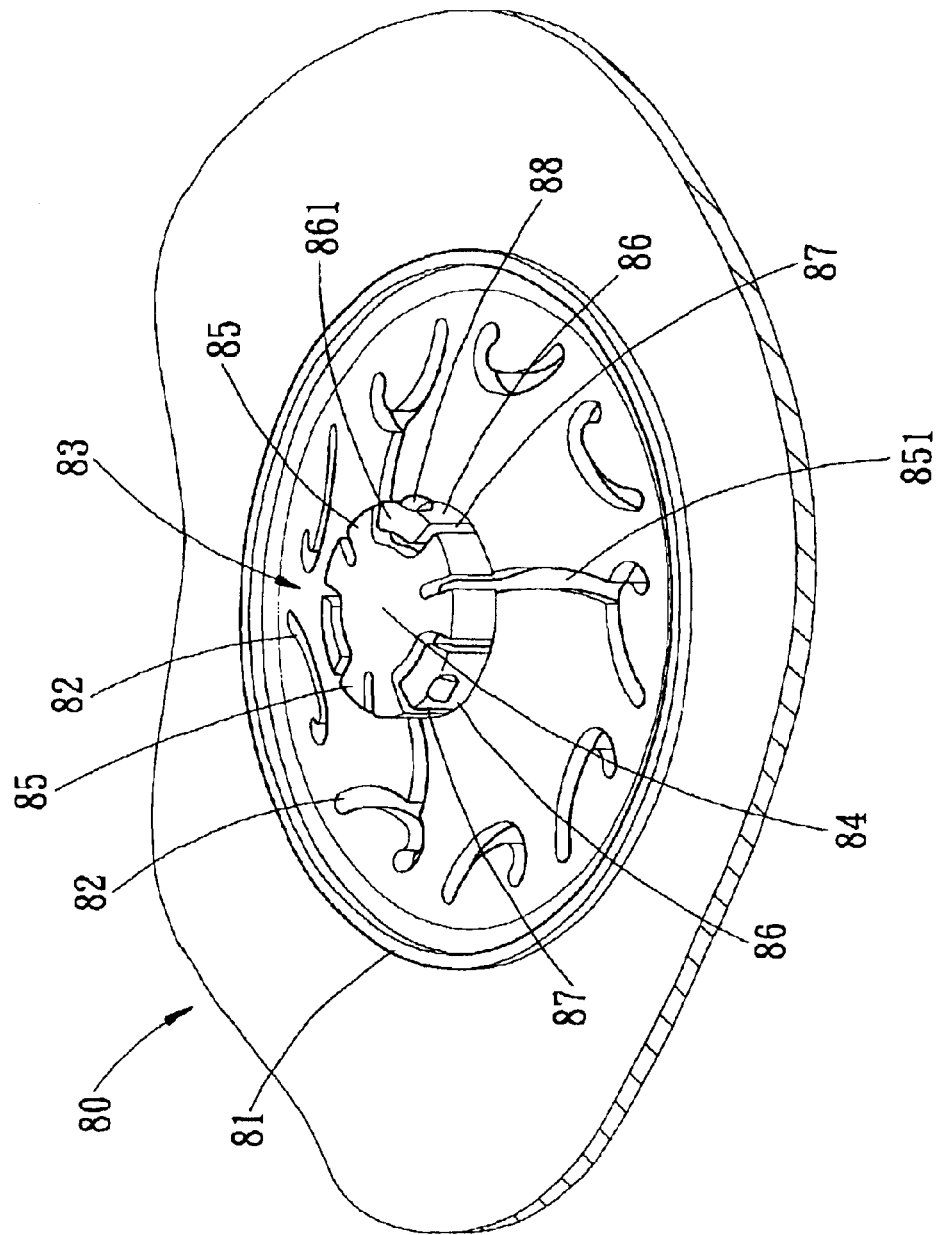
FIG. 5 is a partially enlarged view of the disc storage box having a disc positioning device as shown in FIG. 4.
Figure 6:
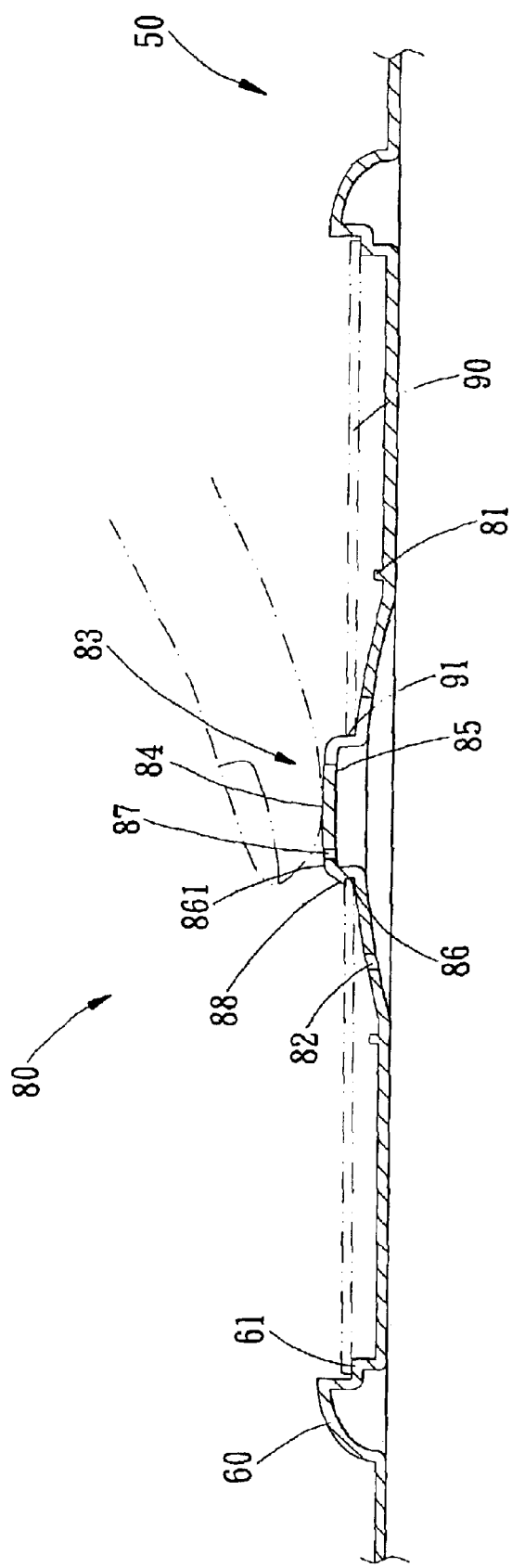
FIG. 6 is a partially cut-away side plan cross-sectional view of the disc storage box having a disc positioning device as shown in FIG. 4.
Figure 7:
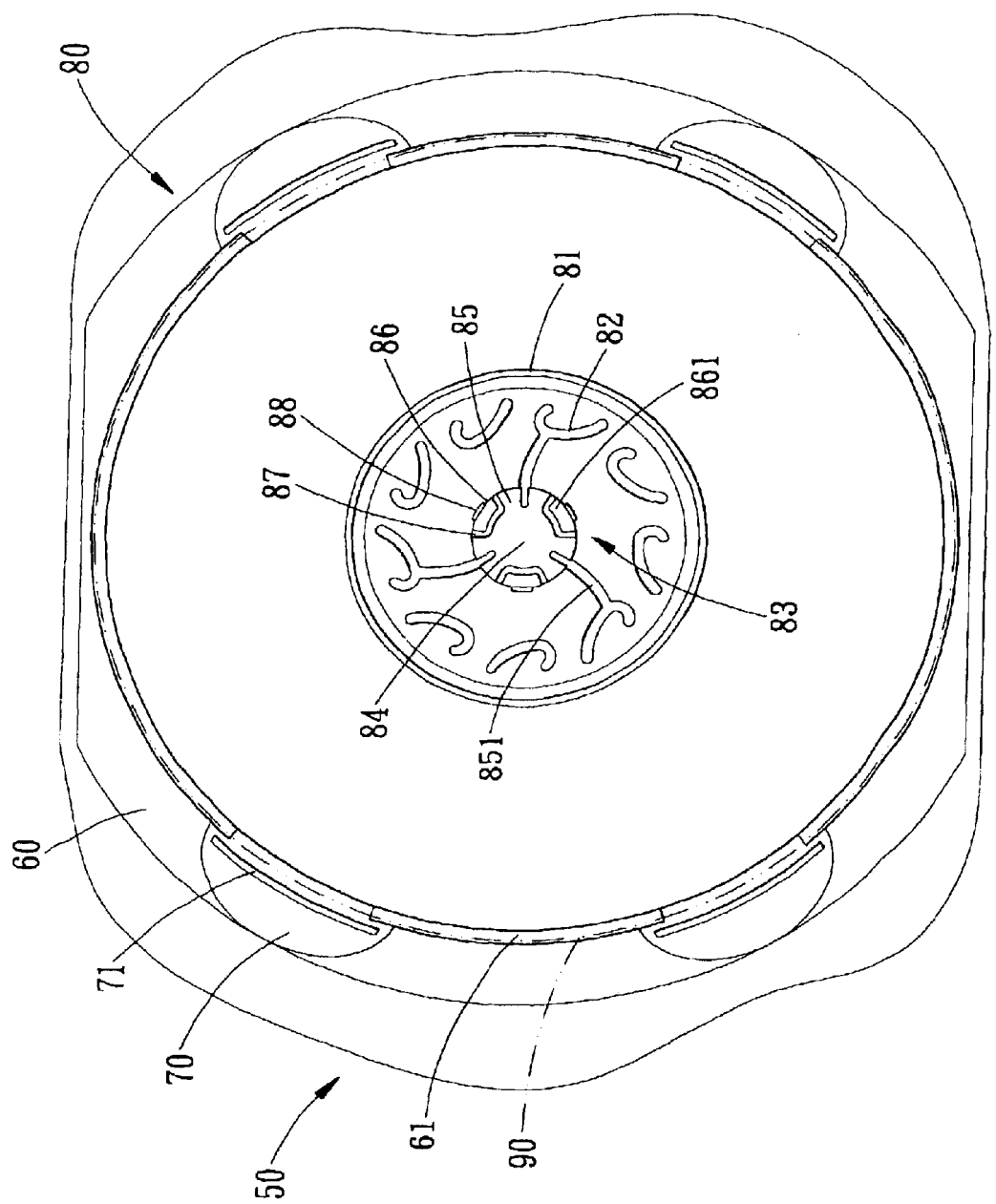
FIG. 7 is a top plan view of the disc storage box having a disc positioning device as shown in FIG. 4.

In operation, referring to FIGS. 6 and 7 with reference to FIGS. 4 and 5, the positioning hole 91 of the disc 90 is mounted on the locking knob 83 of the locking portion 80 of the disc positioning device 50. Then, the user slightly exerts a force to press the press face 84 of the locking knob 83. At this time, the insertion blocks 85 and the locking arms 86 of the locking knob 83 are separated by the gaps 87, and each of the insertion blocks 85 is formed with a slit 851 extended outward and connected to one of the hook slots 82. Thus, when the press face 84 of the locking knob 83 is pressed downward, the locking arms 86 are retracted inward and downward, so that the locking knob 83 is retracted inward, thereby shortening the diameter of the locking knob 83, so that the diameter of the locking knob 83 is smaller than that of the positioning hole 91 of the disc 90. Thus, the wall of the positioning hole 91 of the disc 90 is easily moved downward to pass through the protruding boss 88 of each of the locking arms 86 by guidance of the oblique arcuate guide face 861 of each of the locking arms 86.

After the pressing force applied on the press face 84 of the locking knob 83 is removed, the locking knob 83 is expanded outward by its restoring force, so that the wall of the positioning hole 91 of the disc 90 is locked on the locking knob 83 by the protruding boss 88 of each of the locking arms 86. In such a manner, the disc 90 is placed in the placing portion 60, and is supported by the support flange 61 of the placing portion 60. In addition, the support plate 71 of each of the plurality of insertion portions 70 provides an auxiliary positioning effect on the disc 90.

Thus, the disc 90 is actually mounted on the locking knob 83 easily and conveniently. In addition, the disc 90 is exactly locked on the locking knob 83 stably and rigidly, thereby preventing from detachment of the disc 90 due to a violent vibration or shock.

Figure 8:
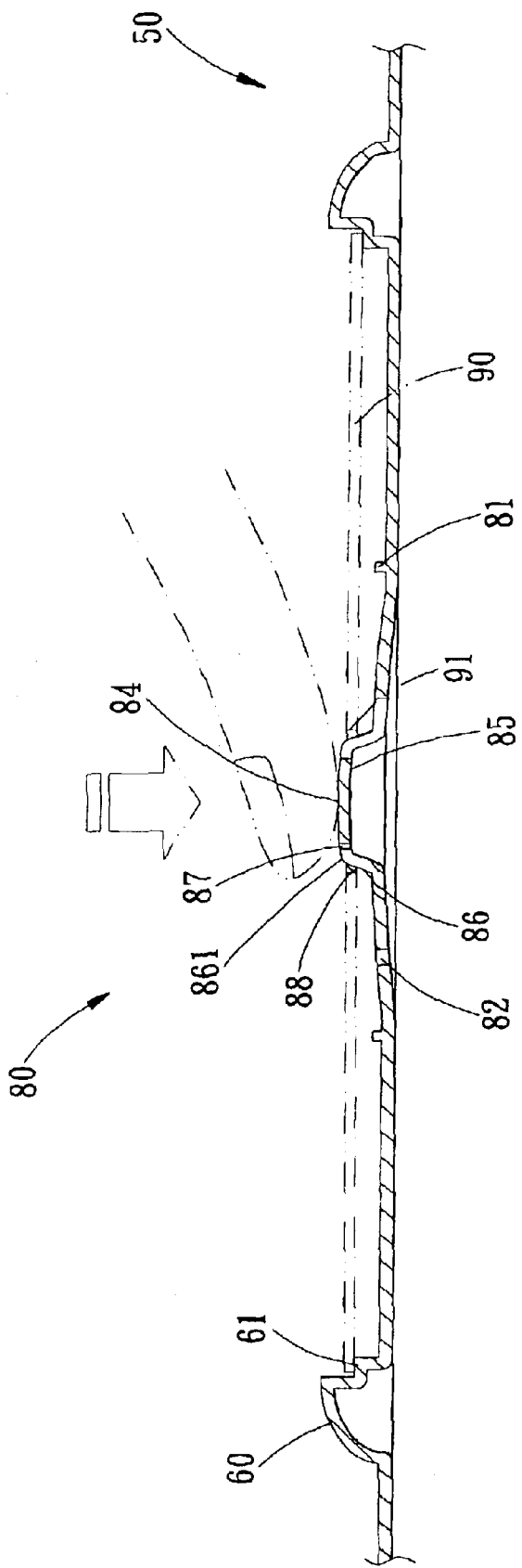
FIG. 8 is a schematic operational view of the disc storage box having a disc positioning device as shown in FIG. 6.
Figure 9:
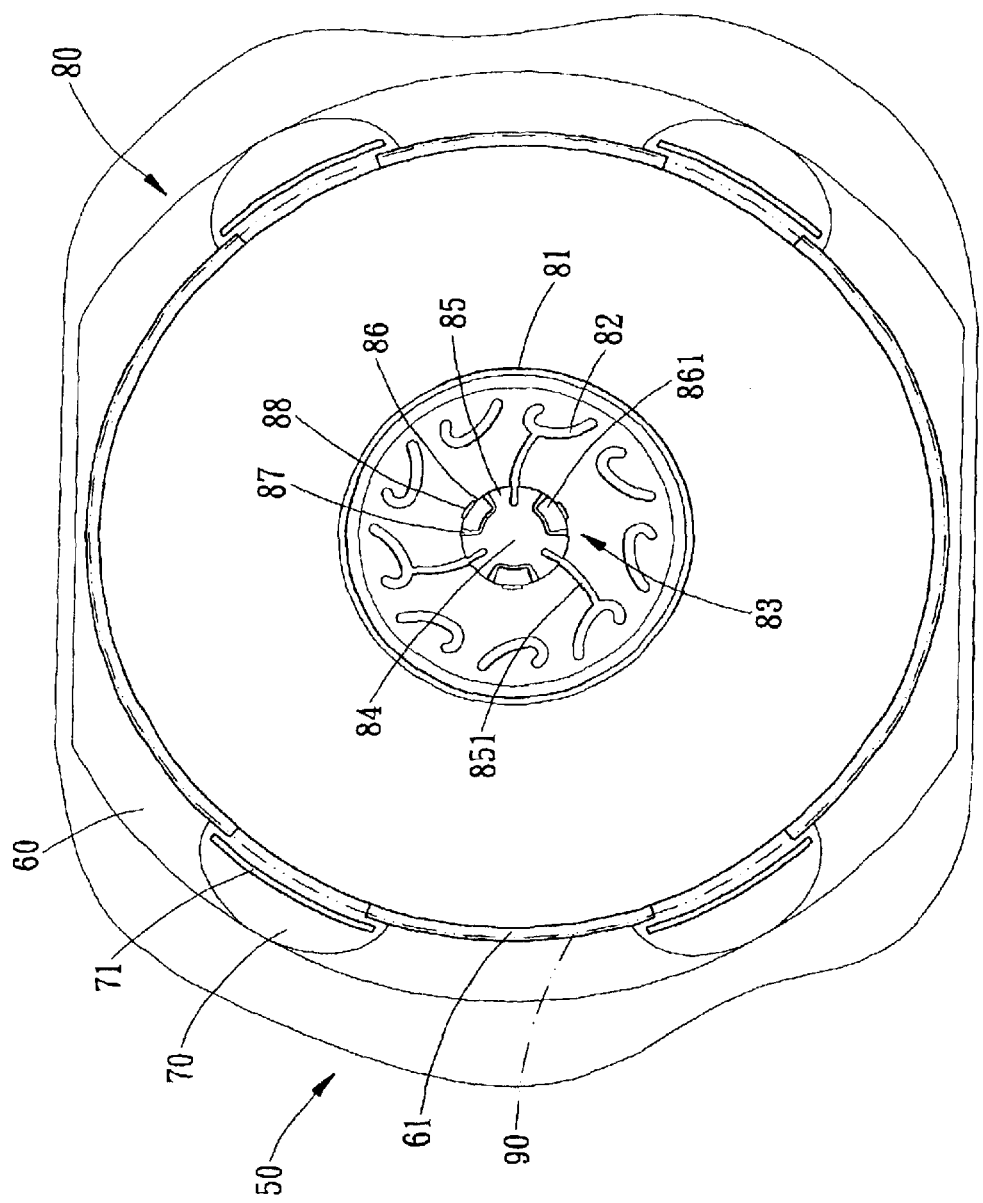
FIG. 9 is a schematic operational view of the disc storage box having a disc positioning device as shown in FIG. 7.

On the other hand, referring to FIGS. 8 and 9 with reference to FIGS. 4 and 5, when the user wishes to remove the disc 90 out of the locking knob 83, the user slightly exerts a force to press the press face 84 of the locking knob 83. At this time, the insertion blocks 85 and the locking arms 86 of the locking knob 83 are separated by the gaps 87, and each of the insertion blocks 85 is formed with a slit 851 extended outward and connected to one of the hook slots 82. Thus, when the press face 84 of the locking knob 83 is pressed downward, the locking arms 86 are retracted inward and downward, so that the locking knob 83 is retracted inward, thereby shortening the diameter of the locking knob 83, so that the diameter of the locking knob 83 is smaller than that of the positioning hole 91 of the disc 90. Thus, the wall of the positioning hole 91 of the disc 90 is easily detached from the protruding boss 88 of each of the locking arms 86, so that the disc 90 is detached from the locking knob 83 easily and conveniently.

In addition, each of the plurality of insertion portions 70 of the disc positioning device 50 has a concave shape, thereby facilitating the user removing the disc 90 from the placing portion 60.

Accordingly, the disc 90 is actually mounted on the locking knob 83 easily and conveniently. In addition, the disc 90 is exactly locked on the locking knob 83 stably and rigidly, thereby preventing from detachment of the disc 90 due to a violent vibration or shock. Further, the disc 90 is detached from the locking knob 83 easily and conveniently.

While the preferred embodiment(s) of the present invention has been shown and described, it will be apparent to those skilled in the art that various modifications may be made in the embodiment(s) without departing from the spirit of the present invention. Such modifications are all within the scope of the present invention.

What is claimed is:

1. A disc storage box having a disc positioning device, comprising a main body, and a disc positioning device integrally formed on the main body, wherein:

the disc positioning device includes a locking portion;

the locking portion of the disc positioning device is formed on the center of the main body and has an inner periphery formed with a plurality of hook slots, the locking portion of the disc positioning device has a central portion formed with a protruding locking knob which has a top formed with a press face;

the locking knob of the locking portion of the disc positioning device has a periphery formed with a plurality of insertion blocks and a plurality of locking arms arranged in a staggered manner, the periphery of the locking knob of the locking portion of the disc positioning device is formed with a plurality of gaps each located between each of the insertion blocks and each of the locking arms;

each of the insertion blocks of the locking knob of the locking portion of the disc positioning device is formed with a slit which is extended outward and connected to one of the hook slots of the locking portion; and each of the locking arms of the locking knob of the locking portion of the disc positioning device is formed with a protruding boss.

2. The disc storage box having a disc positioning device in accordance with claim 1, wherein the locking portion of the disc positioning device has an outer periphery formed with an annular lug.

3. The disc storage box having a disc positioning device in accordance with claim 1, wherein each of the locking arms of the locking knob of the locking portion of the disc positioning device has a top formed with an oblique arcuate guide face located adjacent to the press face.

4. The disc storage box having a disc positioning device in accordance with claim 1, wherein each of the hook slots of the locking portion of the disc positioning device has an arcuate shape.

5. The disc storage box having a disc positioning device in accordance with claim 1, wherein the disc positioning device includes a circular placing portion formed on and protruded from the main body, the placing portion of the disc positioning device has an inner periphery formed with a support flange.

6. The disc storage box having a disc positioning device in accordance with claim 5, wherein the disc positioning device includes a plurality of insertion portions each formed on the placing portion and each having a concave shape.

7. The disc storage box having a disc positioning device in accordance with claim 6, wherein each of the plurality of insertion portions of the disc positioning device is formed with an arcuate support plate.

* * * * *